June 30, 1942.  G. H. BLOOM  2,288,066
MULTIPLE INDEX
Filed June 4, 1941
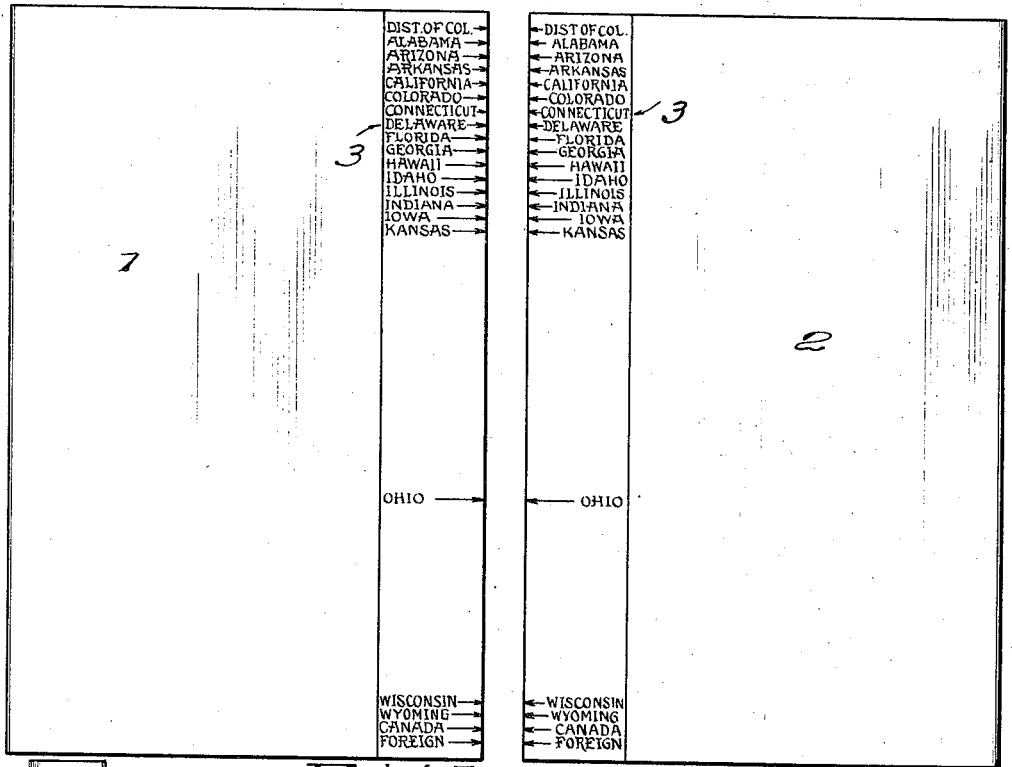
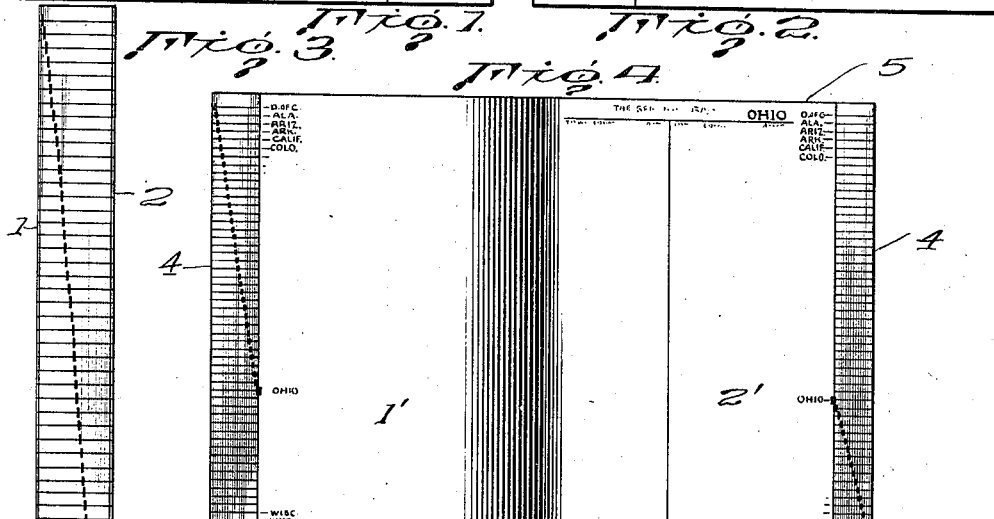
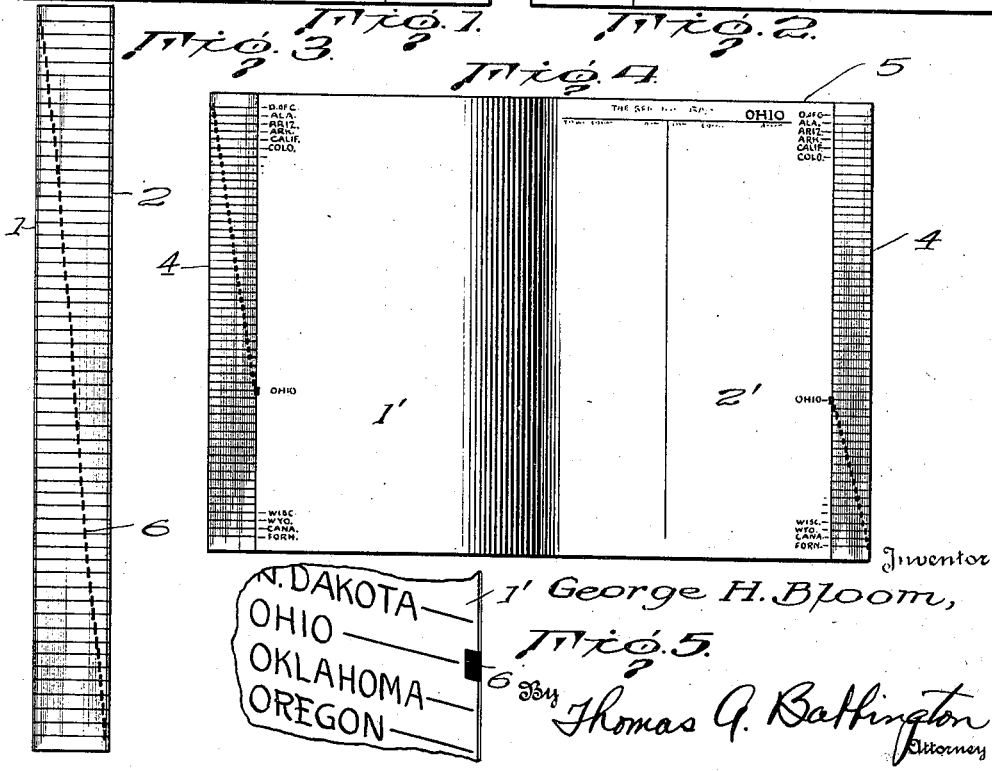
Inventor
George H. Bloom,
By Thomas G. Battington
Attorney Patented June 30, 1942

2,288,066

UNITED STATES PATENT OFFICE 2,288,066

MULTIPLE INDEX

George H. Bloom, New York, N. Y.

Application June 4, 1941, Serial No. 396,622

2 Claims. (Cl. 283—49)

The present invention relates to multiple indexes for books. More particularly, the present invention relates to a two-way index which may be utilized whether the book is opened or closed.

It is well known that the ordinary manner of indexing books causes loss of time due to the necessity of thumbing through each page until the desired one is located. In the use of professional directories, such as legal, medical, and the like, to which this invention is particularly adapted, such loss of time and thumb-paging is annoying and often expensive. It is, therefore, a primary object of the present invention to provide a two-way index by means of which any data sought may be instantly found.

It is a further object of this invention to provide additional means cooperating with the indexes which means aid in the instant location of any particular page or chapter.

A still further object of the invention is to provide guide lines on the book edge cooperating with individual markings on each page to facilitate ready reference.

These and other objects will appear as the description and appended claims are read in conjunction with the attached drawing wherein:

Figure 1 is a plan view of the front cover showing one of the indexes thereon;

Figure 2 is a similar view of the back cover showing another of the indexes;

Figure 3 is an edge view of a book disclosing the parallel lines and markings which appear on each individual page;

Figure 4 is a face view of the book open and disclosing the arrangement of indexes on each individual page; and, Figure 5 is a fragmentary view of one of the pages showing the manner of marking each page.

With continued reference to the drawing wherein like reference numerals are employed throughout the several figures to indicate the various parts, the numeral 1 indicates the front cover of a book. 2 is a showing of the rear cover thereof.

The numeral 3 indicates an index placed, preferably by printing, along the edge of each cover. In this instance, the names of States are shown but it is obvious that other identifying data may be used.

The numeral 4 in Figure 4 indicates parallel guide lines which are spaced along the edge of the pages from cover to cover as shown and which lead to the chapter or head of any indexed material. Arrows appearing in Figure 1 cooperate with the guide lines 4 to aid in the instant finding of indexed data.

The reference numeral 5 in Figure 4 is used to indicate a book opened at any given place and disclosing the individual indexes appearing on each page and their relation to the guide lines 4 and markings 6. 6 indicates a marking or symbol placed on each page of the book and cooperating with the guide lines 4.

It will be seen from the above that the invention serves as an instant guide to any indexed material and without loss of time.

In using the invention when the book is closed the place sought may be found through the index on the front cover or through the index on the rear cover and by following the arrow to the guide line 4 to the head of a chapter, or any material so indexed and indicated by the special or additional marking on the edge of each page.

When the book is opened, the material sought may be found by referring to the index on the edge of either page and upon finding the chapter desired, instant reference may be made to such chapter by following the guide line 4 as explained above.

It is apparent that the individual indexes cooperating with the arrows and guide lines 4 and the markings 6 combine to form a two-way index which facilitates the instant location of any material desired without loss of time.

The invention may be embodied in other specific forms without departing from the essential characteristics thereof. The present form illustrated in the drawing therefore is not to be considered as restrictive, the scope of the invention being indicated by the appended claims, rather than by the foregoing description. What is claimed and desired to be secured by United States Letters Patent is:

1. A book having an index-register on the face of its front cover comprising a multiplicity of indicia in the form of parallel markings including lines which extend toward one edge of the cover, a corresponding set of markings disposed upon the front face of each page of the book and directly underlying those of the cover, the lines of said corresponding set going fully to the page edges so as to be visible when the book is closed, and means visibly dividing the closed book into a number of sections corresponding to the number of indicia, said means comprising further markings of much greater width than the lines and disposed one upon each page at the outer extremity of one of the lines of that page so that it appears as a short cross-line along the edge of said page when the book is closed.

2. In the structure defined in claim 1, there being a set of further indicia on the back cover also, said further indicia corresponding to those of the front and arranged directly opposite thereto, and the back of each page likewise being marked correspondingly, whereby the edge of the closed book has a series of transverse lines extending from cover to cover, each line crossed by a visible dividing mark perpendicular thereto.

GEORGE H. BLOOM.